(12) United States Patent
Ully et al.

(10) Patent No.: US 11,867,329 B2
(45) Date of Patent: Jan. 9, 2024

(54) FLUID CONNECTION DEVICE

(71) Applicant: HUTCHINSON, Paris (FR)

(72) Inventors: Stéphane Ully, Chalette sur Loing (FR); Julien Mongendre, La Chapelle Saint Mesmin (FR)

(73) Assignee: HUTCHINSON, Paris (FR)

( * ) Notice: Subject to any disclaimer, the term of this patent is extended or adjusted under 35 U.S.C. 154(b) by 388 days.

(21) Appl. No.: 16/925,761

(22) Filed: Jul. 10, 2020

(65) Prior Publication Data

US 2021/0010625 A1   Jan. 14, 2021

(30) Foreign Application Priority Data

Jul. 12, 2019 (FR) ...................................... 1907854

(51) Int. Cl.
*F16L 33/035* (2006.01)
*H01M 10/613* (2014.01)
*H01M 10/625* (2014.01)
*H01M 10/6568* (2014.01)

(52) U.S. Cl.
CPC .......... *F16L 33/035* (2013.01); *H01M 10/613* (2015.04); *H01M 10/625* (2015.04); *H01M 10/6568* (2015.04); *H01M 2220/20* (2013.01)

(58) Field of Classification Search
CPC . F16L 33/035; H01M 10/613; H01M 10/625; H01M 10/06568
See application file for complete search history.

(56) References Cited

U.S. PATENT DOCUMENTS

| 7,481,463 B2 * | 1/2009 | Ishida ..................... F16L 41/08 |
| | | 285/190 |
| 7,874,595 B2 * | 1/2011 | Lechner ................ F16L 37/133 |
| | | 285/305 |
| 2007/0087266 A1 * | 4/2007 | Bourke ............... H01M 50/207 |
| | | 429/61 |
| 2012/0043754 A1 * | 2/2012 | Gadawski ......... H01M 10/6555 |
| | | 285/189 |

FOREIGN PATENT DOCUMENTS

| CN | 1760580 B * | 7/2011 | ......... B29C 33/0083 |
| DE | 202007004452 U1 | 5/2007 | |
| EP | 0568075 A1 | 11/1993 | |
| GB | 2244774 A | 12/1991 | |
| WO | 2012/002678 A2 | 1/2012 | |

OTHER PUBLICATIONS

Rapport de Recherche Préliminaire mailed Mar. 18, 2020, issued in priority French Application No. 1907854, filed Jul. 12, 2019, 2 pages.

* cited by examiner

*Primary Examiner* — Jonathan G Jelsma
(74) *Attorney, Agent, or Firm* — Christensen O'Connor Johnson Kindness PLLC

(57) ABSTRACT

A fluid connection device comprising a body formed of one single part and comprising a first tubular nozzle comprising a male part, and at least two elastically-deformable tabs provided to retain the male part in a female part, wherein the device further comprises a lock mounted on the body and mobile in translation from a first position wherein the tabs are released, allowing their elastic deformation, to a second position wherein the tabs are blocked, preventing their elastic deformation.

18 Claims, 7 Drawing Sheets

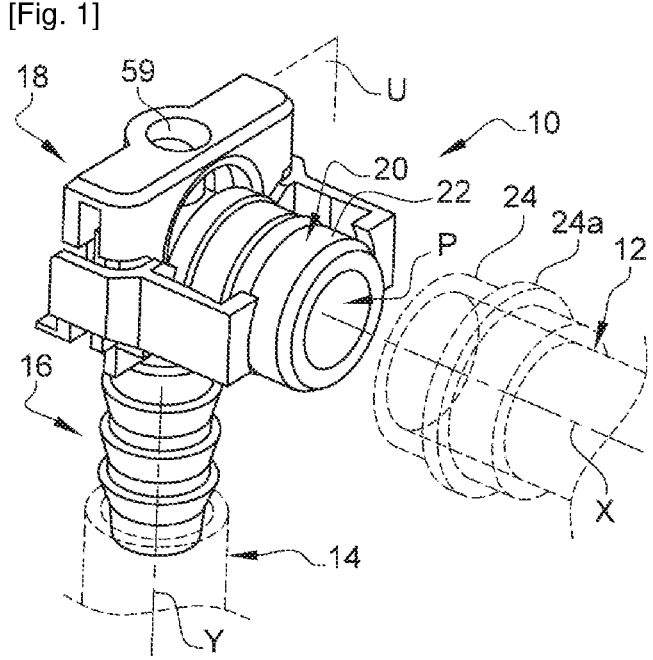
[Fig. 1]

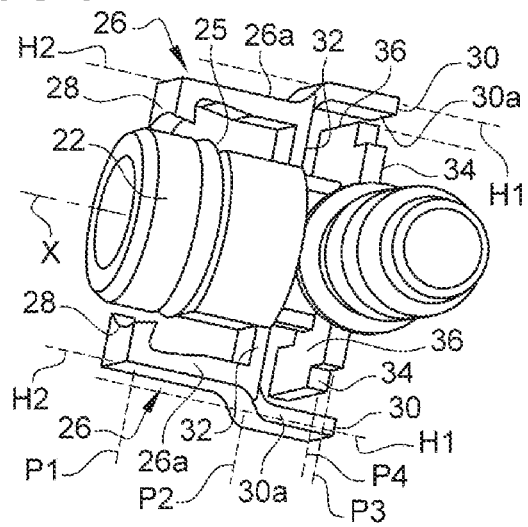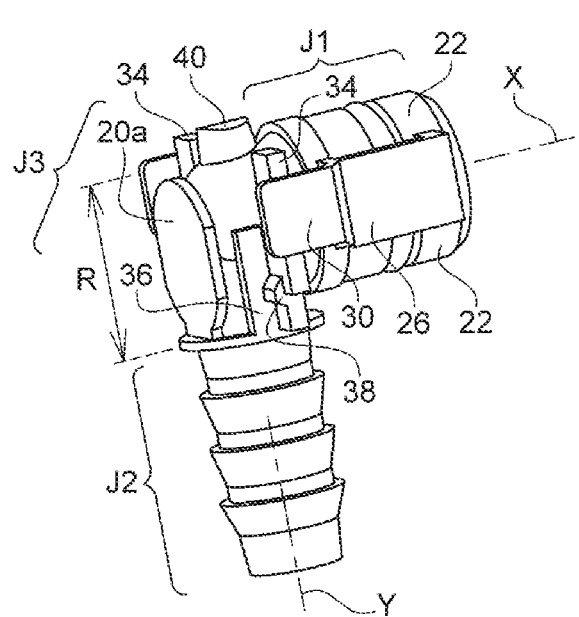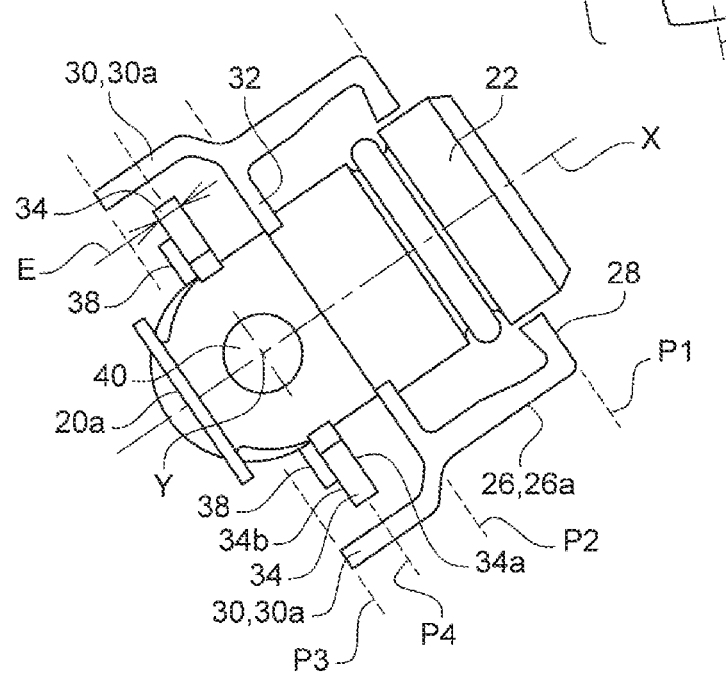

[Fig. 5]
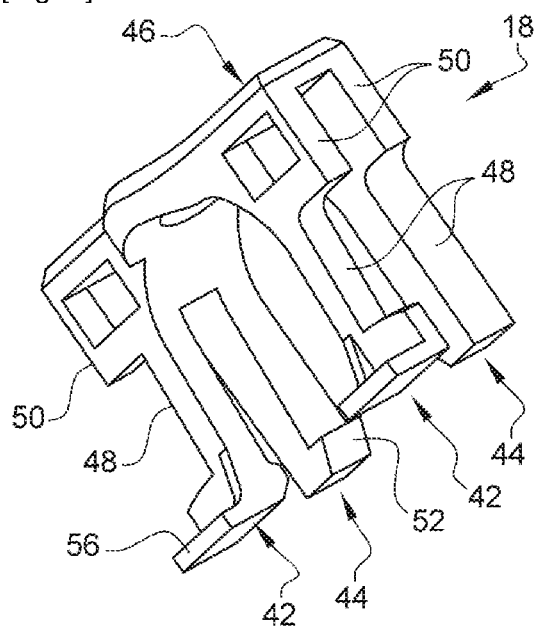
[Fig. 6]
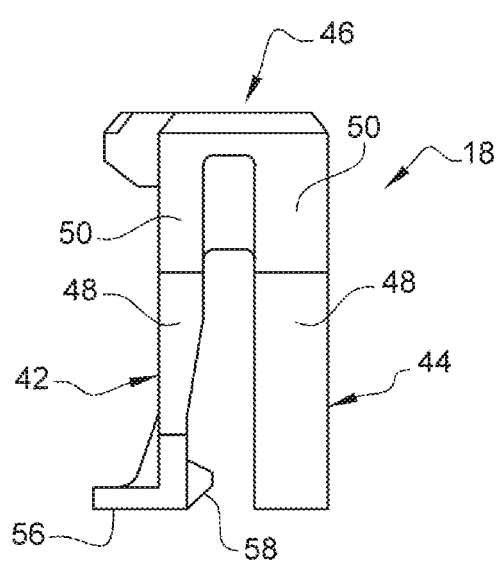
[Fig. 7]
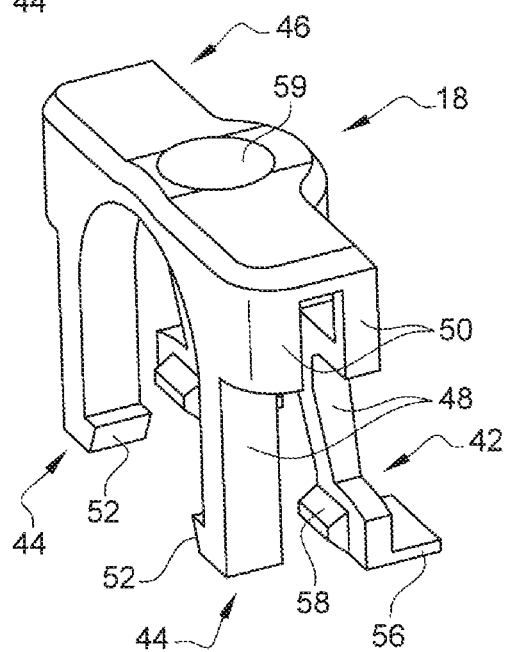

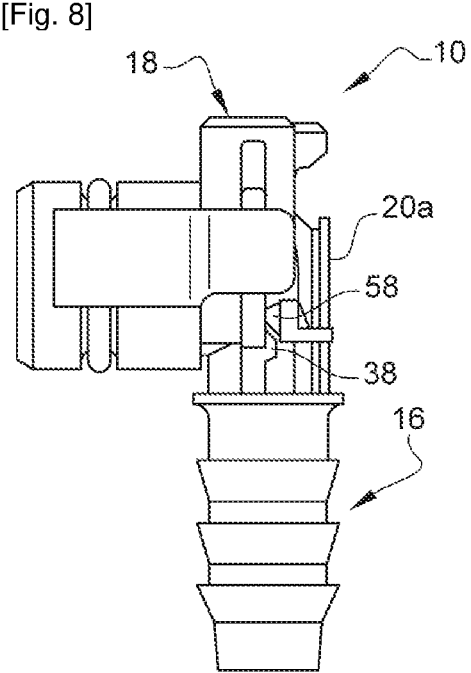

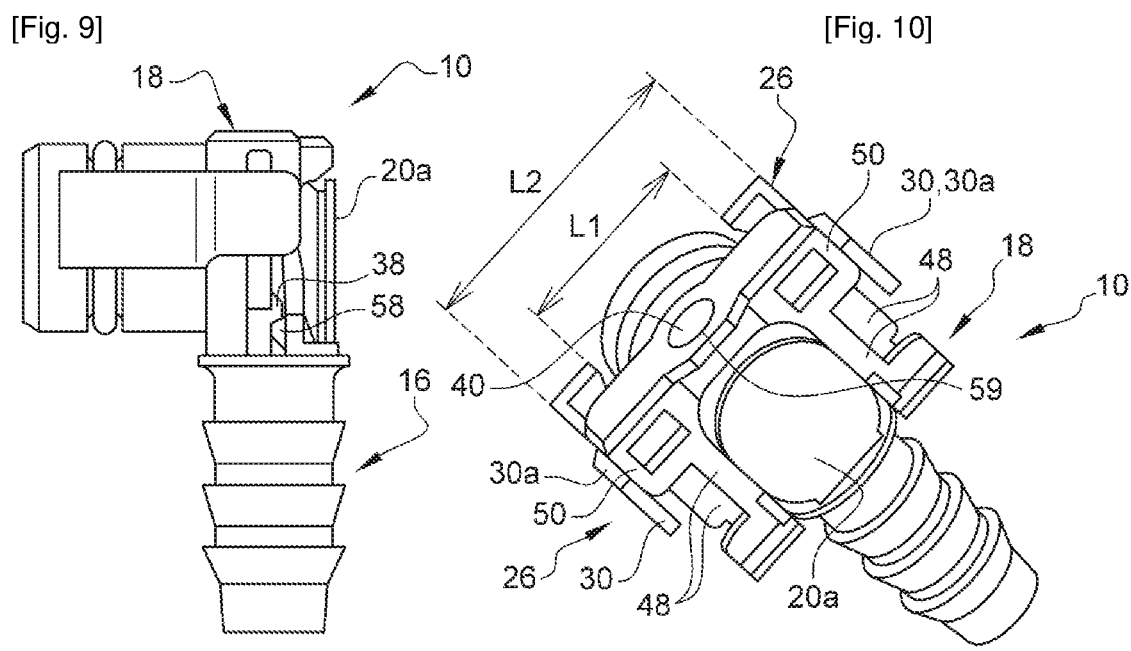

[Fig. 11]
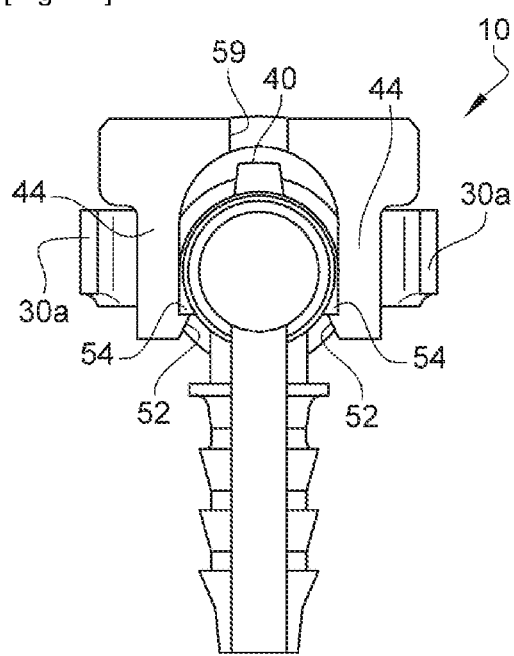
[Fig. 12]
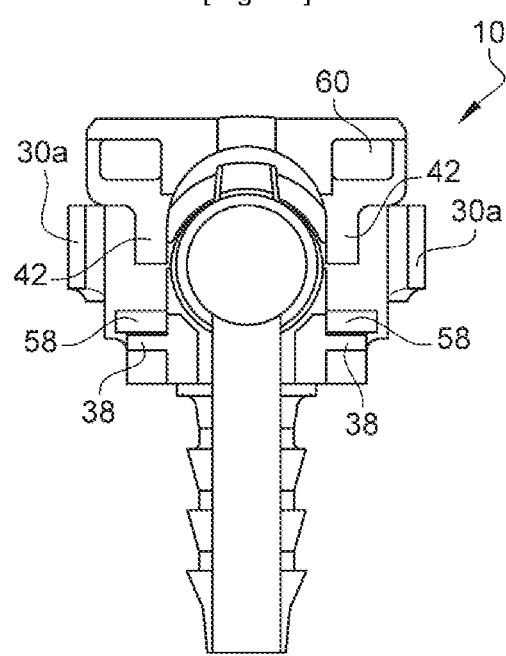

[Fig. 13]
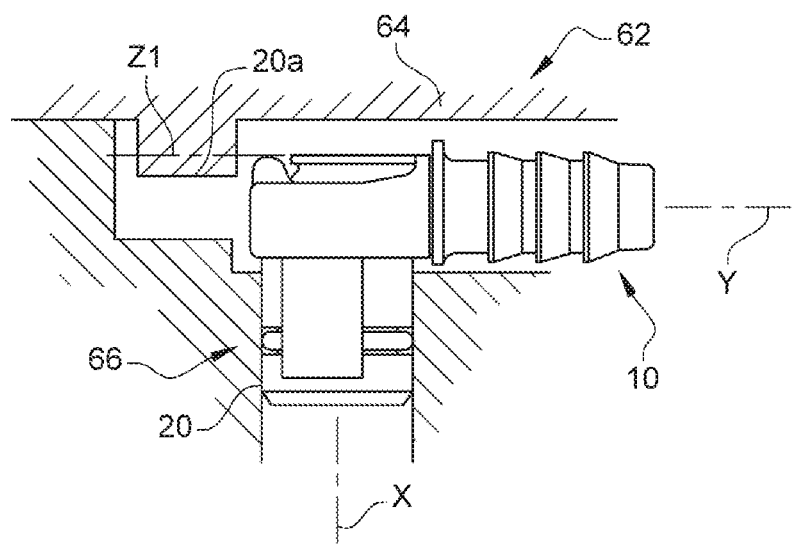
[Fig. 14]
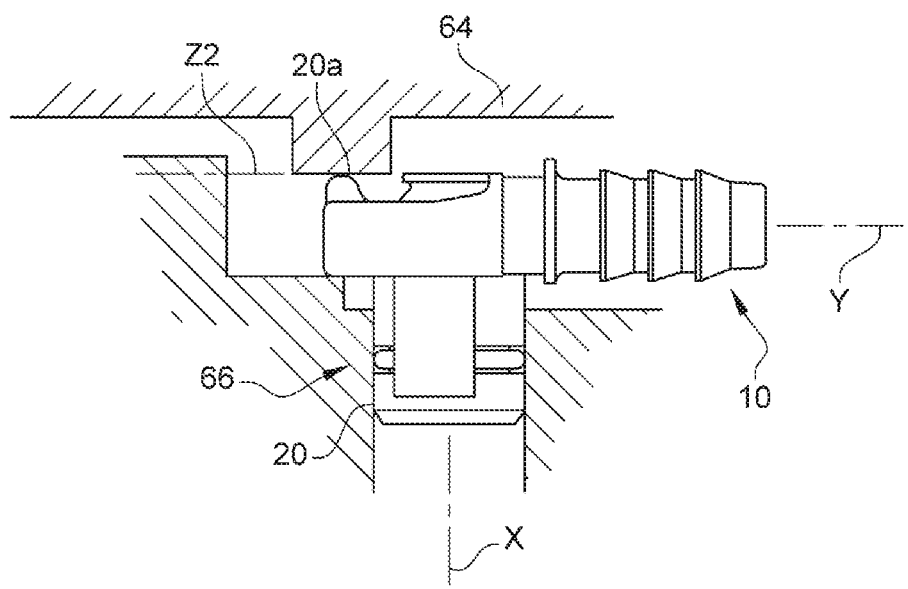

FLUID CONNECTION DEVICE

TECHNICAL FIELD

Embodiments of the present disclosure relate to a fluid connection device, in particular for a motor vehicle, the device being able to be used in a cooling circuit of a component, such as a battery, a computer or an internal combustion engine, for example.

BACKGROUND

The technical background comprises, in particular, documents GB-A-2 244 774, DE-U1-20 2007 004452, WO-A2-2012/002678 and EP-A1-0 568 075, the disclosures of which are incorporated by reference in their entirety.

A fluid connection for a fluid circuit must be reliable, and in particular adequately sealed and long-lasting. It is moreover important to ensure that the connection is properly secured and can be locked to guarantee that unexpected disconnections cannot occur.

Nowadays, there are numerous connection devices that claim to provide a proper connection between two nozzles, respectively a male and a female nozzle. However, these devices are generally very voluminous and comprise several parts to achieve these functions. Furthermore, they are also complex and costly to manufacture.

The present disclosure proposes an improvement to this technology that is simple, effective and cost-efficient.

SUMMARY

The disclosure relates to examples of a fluid connection device, which are suitable for use in one or more fluid circuits of a motor vehicle, for example. In an embodiment, the fluid connection device comprises:
- a first tubular nozzle comprising a male part configured to be engaged in a female part of a second nozzle by an axial translation movement along an axis,
- at least two elastically-deformable tabs that are diametrically opposed with respect to the axis, these tabs extending outwards from the first nozzle, substantially parallel with the axis, and comprising first axial ends comprising retaining members configured to engage with the female part in order to lock it axially with respect to the male part, and second opposite axial ends comprising handling members for the purpose of elastically deforming the tabs and unlocking the male and female parts.

In some embodiments, the device further comprises a lock mounted on the body and mobile in translation on the body in a plane substantially perpendicular to the axis, from a first position in which the tabs are released, allowing the elastic deformation thereof, to a second position in which the tabs are blocked, preventing their elastic deformation.

Generally, the device can be comprised of two parts and is therefore easy and inexpensive to manufacture. For example, the device can comprise a body that includes a male nozzle and tabs intended to retain the male nozzle with respect to a female nozzle wherein it is intended to be engaged. The device can further comprise a lock configured to engage with the tabs to allow or prevent their elastic deformation. The lock is advantageously moved manually between its positions by an operator who can ensure the proper locking and engagement of the connection, either visually or by way of adequate control equipment, such as a camera, for example.

According to embodiments of the disclosure, the device can comprise one or more of the following features, taken individually or in any combination:
- the lock is generally U-shaped and is mounted to straddle the first nozzle;
- the lock comprises a first pair of legs extending on either side of the first nozzle and configured to extend from the first nozzle to the second ends;
- the legs are adapted to allow an elastic deformation of the tabs when the lock is in the first position, and to block an elastic deformation of the tabs when the lock is in the second position;
- the legs comprise cavities adapted to receive the second ends of the tabs when the lock is in the first position, and abutments adapted to engage by bearing with the second ends of the tabs when the lock is in the second position;
- the legs comprise protruding teeth configured to engage by elastic snap-fitting with elements of the first nozzle, when the lock is moved between the first and the second position;
- the legs comprise gripping parts at their free ends;
- the protruding teeth extend on one side of the legs, and the gripping parts are formed by edges that extend on the opposite side of the legs.
- the lock comprises a second pair of legs extending on either side of the first nozzle and configured to extend from the first nozzle to the second ends;
- the legs of the second pair are adapted to engage with the first nozzle in order to ensure the lock is maintained on the first nozzle;
- the legs of the second pair comprise maintaining hooks configured to engage with elements of the first nozzle;
- the legs of the second pair are separated from the legs of the first pair by small walls protruding from the first nozzle;
- the legs of the first pair and/or of the second pair are elastically deformable, for example by bending;
- the small walls are diametrically opposed with respect to the axis and extend in the same plane perpendicular to the axis and intersecting with the second ends;
- the lock comprises at least one window for the engagement of a protruding portion of the first nozzle, during the displacement of the lock from its first position to its second position;
- the lock comprises at least one opening through which it is possible to see the first nozzle when the lock is in the second position, the first nozzle being impossible to see when the lock is in the first position;
- the device is generally L-shaped or has an elbow, its male part extending along an axis X and the device comprising another connection part along an axis Y substantially perpendicular to the axis X,
- the device has an axial dimension along the axis X that is smaller than the axial dimension of the device along the axis Y; if the axis X is vertical in the position of use, it reduces the vertical dimension of the device.

The disclosure also relates to examples of a cooling circuit for a vehicle, for example a motor vehicle. In an embodiment, the cooling circuit comprises at least one device such as described above.

The disclosure further relates to examples of a battery pack for a motor vehicle comprising a box containing batteries and a cooling circuit such as described above, wherein the box comprises, for example, a removable cover configured to cover or rest on the device.

Advantageously, the device comprises a bearing surface of the cover or a surface covered by the cover, the surface extending in a plane substantially perpendicular to the axis X.

The disclosure also relates to examples of a vehicle, for example a motor vehicle, comprising a fluid circuit equipped with at least one device such as described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 is a schematic and perspective view of a fluid connection device according to an embodiment of the disclosure;

FIGS. 2 to 4 are schematic views on a larger scale of a body of the device of FIG. 1;

FIGS. 5 to 7 are schematic views on a larger scale of a lock of the device of FIG. 1;

FIG. 8 is a schematic and perspective view of the device of FIG. 1, the lock being in a first unlocking position;

FIGS. 9 and 10 are schematic and perspective views of the device of FIG. 1, the lock being in a second locking position;

FIGS. 11 and 12 are schematic and cross-sectional views of the device of FIG. 1, respectively according to two parallel planes, the lock being in the first unlocking position; and FIGS. 13 and 14 are highly schematic views of a device according to the disclosure in an operating environment, the lock being in the second locking position in FIG. 13 and in the first unlocking position in FIG. 14.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIGS. 1 to 12 show an embodiment of a fluid connection device 10 according to the disclosure, for example for a cooling circuit of an internal combustion engine of a motor vehicle. The device 10 can be used to connect two pipes 12, 14, schematically represented by dotted lines in FIG. 1. Broadly speaking, the device 10 comprises two parts, which are a body 16 and a lock 18. It could also comprise other parts such as seals, for example.

The body 16 is shown alone in FIGS. 2 to 4. The body 16 is formed, for example, of one single part and comprises a nozzle 20 that defines an internal passage P for the circulation of a fluid, for example from the pipe 12 towards the pipe 14. In the example shown, the nozzle 20 is L-shaped and has an elbow, but in an alternative version it could also be straight. Thus, the nozzle 20 comprises two parts J1, J2, or tubular branches that are substantially straight and perpendicular to one another. These parts J1, J2 are connected to one another by a junction J3 (see FIG. 3).

In the embodiment shown, the junction J3 comprises a rear face 20a that is opposite the opening of the passage P of the nozzle 20 and that extends in a plane perpendicular to the axis X. In an embodiment, the axial distance (measured along the axis X) between this opening (or free end of the nozzle 20) and the face 20a is smaller than or equal to 30 mm, and even 25 mm. This face 20a is, for example, aligned with the outer periphery of the part J2.

The part J2 of the nozzle 20 is in this case configured to be secured to the pipe 14, for example by force-fitting. This engagement can be achieved by axial translation of this part along the axis Y. This part J2 can comprise a Christmas tree like profile comprising annular ribs provided for their anchoring in the material of the pipe 14.

The other part J1 of the nozzle 20 is a male part 22 and is configured to be engaged in a female part 24 of a second nozzle provided on the pipe 12. This engagement is achieved by axial translation of this part 22 along the axis X and the connection is of the snap-fitting type. The female part 24 comprises, for example an outer annular rib 24a provided for the snap-fitting connection. The male part 22 has a general cylindrical shape and comprises an outer annular groove for the housing of a seal 25 in the example shown.

The body 16 or the nozzle 20 also comprises two elastically-deformable tabs 26. In the embodiment shown, the tabs 26 are diametrically opposed with respect to the axis X and extend outwards from the nozzle 20, for example from the male part 22, substantially parallel with the axis X (FIG. 2). They comprise first axial ends comprising retaining members 28, such as hooks, configured to engage with the female part 24, for example with its rib 24a, in order to axially lock the parts 22, 24 and therefore the male and female nozzles.

The tabs 26 further comprise second opposite axial ends comprising handling members 30, such as fins 30a, for the purpose of elastically deforming the tabs 26 and unlocking the male and female parts. Each tab 26 can comprise a substantially flat wall 26a with an axial end that includes the edge forming the retaining member 28, extending radially towards the axis X. This wall 26a is connected at its opposite end to the fin 30a that forms the handling member 30.

The wall 26a of each tab 26 extends at a distance from and along the male part 22 and is connected to the male part by a connecting shroud 32 extending radially between the wall 26a and the male part 22. The fin 30a extends, parallel with the axis X, on the opposite side of the edge 28 and covers a part of the nozzle 20 and its junction J3 in some embodiments.

FIG. 2 shows that the fins 30a extend in planes H1 that are parallel with one another and with the axis X. These planes H1 are parallel with the planes H2 intersecting with the walls 26a of the tabs 26, and at a distance from these planes H2.

In the example shown, the members 28 are located in a plane P1 perpendicular to the axis X and located in the vicinity of the free end of the male part 22. The connecting shrouds 32 are located in a plane P2 perpendicular to the axis X and located in the vicinity of the opposite end of the male part 22. The seal 25 is located between the planes P1 and P2. The free ends of the fins 30a, opposite the members 28, are located in a plane P3 perpendicular to the axis X.

The body 16 further comprises two small walls 34 diametrically opposite one another with respect to the axis X and to the axis Y. These small walls 34 protrude on the junction J3 and extend in a plane P4 perpendicular to the axis X and substantially intersecting with the axis Y (FIG. 4).

The walls 34 have a thickness given as E, measured along the axis X, and a height given as R, measured along the axis Y (FIGS. 3 and 4). The fins 30a extend above and at a distance from the small walls 34 and have an axial dimension, measured along the axis X, greater than E. A part of each fin 30a extends above and to the front of the corresponding small wall 34, and a part extends above and to the rear of this small wall. The fins 30a have dimensions along the axis Y that are smaller than the heights R.

Each small wall 34 comprises a first face 34a located on the side of the male part 22, and a second face 34b located on the opposite side (FIG. 4). Each of the faces 34a, 34b is connected, for example, to a guiding surface 36 located on the junction J3 and extending substantially parallel with the axes X and Y (FIGS. 2 and 3).

The faces 34b further comprise protruding teeth 38. Each of the faces 34b comprises a tooth 38 that is in this case located in the vicinity of an end of the small wall 34 located on the side of the junction J2 (FIGS. 3 and 4).

Finally, on the junction J3, the body 16 comprises a cylindrical peg 40 centered on the axis Y (FIGS. 3 and 4).

As mentioned above, the body 16 is made of one single part and of, for example, a plastic material such as polyamide. The seal 25 is an O-ring in the example shown, for example made of an elastomer.

The lock 18 is formed of one single part, for example of injected plastic material. It is shown alone in FIGS. 5 to 7. The lock 18 is mounted on the body 16 and is mobile in translation in a plane U substantially perpendicular to the axis X, for example intersecting with the axis Y (FIG. 1).

The lock 18 is mobile from a first position whereby the tabs 26 are released, as shown in FIGS. 1 and 8, to a second position whereby the tabs are locked, as shown in FIG. 9.

When the lock 18 is in the position whereby the tabs 26 are released, these tabs can freely undergo elastic deformation. The device 10 is then in an unlocked state. When the lock 18 is in the position whereby the tabs 26 are locked, these tabs cannot undergo elastic deformation. The device 10 is then in a locked state.

In the example shown, the lock 18 is generally U-shaped and is mounted to straddle the nozzle. The lock 18 thus forms a rider.

The lock 18 comprises at least one pair of legs 42 and comprises two pairs of legs 42, 44, connected to one another by a bridge 46 in some embodiments. The legs 42, 44 of each pair are configured to extend on either side of the nozzle 20 and are configured to extend from the nozzle to the fins 30a for example from the junction J3 to these fins.

The legs 42, 44 are adapted to allow an elastic deformation of the tabs 26 when the lock 18 is in the first position, by leaving a free space available to the tabs intended for their deformation (FIGS. 1 and 8). The legs 42, 44 are further adapted to block an elastic deformation of the tabs 26 when the lock 18 is in the second position, by occupying the abovementioned spaces and engaging with the tabs by abutment.

To this end, the legs 42, 44 comprise cavities 48 adapted to receive the fins 30a of the tabs 26 when the lock 18 is in the first position, and abutments 50 adapted to engage by bearing with these fins when the lock 18 is in the second position;

Indeed, FIG. 1 shows that the cavities 48 of the legs 42, 44 are positioned to face the fins 30a of the tabs 26 in the first position. The space between the legs 42, 44 and the tabs 31a is sufficient to elastically deform the tabs 26. FIG. 10 shows that the abutments 50 of the legs 42, 44 are positioned to face the fins 30a of the tabs in the second position. The fins 30a can come to rest against these abutments 50 when an operator attempts to deform the tabs, the deformation being impossible in this case.

The legs 44 comprise protruding retaining hooks 52 configured to engage by abutment with elements, such as supports 54, of the nozzle 20, to render to lock 18 captive, i.e. to prevent the lock 18 from coming undone from the body 16 (FIG. 11).

Each of the legs 42, 44 has a generally rectilinear shape. The legs 42, 44 of each pair are spaced by a distance that enables the pair to be mounted on the body 16, for example on the junction J3. The legs 42, 44 located on a side of the lock 18 are further spaced from one another by a distance slightly greater than the abovementioned thickness E, such that they can be inserted and slid on either side of the corresponding small wall 34.

At the level of the cavities 48, the legs define a width L1. At the level of the abutments, the legs define a width L2 greater than L1 and slightly smaller than the distance between the fins 30a. The widths L1, L2 are measured in a direction that is perpendicular to the axes X and Y.

The legs 42 located on the side of the male part 22 are intended to be inserted between the fins 30a and the junction J3, on one side of the small walls 34. These legs 42 are advantageously elastically deformable. The other legs 44 are intended to be inserted between the fins 30a and the junction J3, on the other side of the small walls 34. The legs 44 are therefore separated from the legs 42 by the small walls 34.

The legs 42 comprise, at their free ends opposite the bridge 46, gripping parts 56 that can be freely handled by an operator, as is described below. The legs 42 further comprise protruding teeth 58 configured to engage by elastic snap-fitting with the teeth 38 of the nozzle 20, when the lock 18 is moved between the abovementioned positions. The teeth 58 extend on one side of the legs 42, in this case on the side of the other legs 44, and the gripping tabs 56 are formed by edges that extend on the opposite side.

The bridge 46 of the lock 18 comprises a window 59 for the engagement of the cylindrical pin 40. The window 59 has in this case a shape that fits with that of the pin 40 and engages by sliding with the pin 40 to facilitate the guiding of the lock 18 during its displacements between the abovementioned positions.

The bridge 46 of the lock 18 comprises at least one opening 60 through which it is possible to see the nozzle 20 when the lock 18 is in the second position, the first nozzle being impossible to see when the lock is in the first position (see FIG. 12). In the example shown, the bridge 46 comprises two openings 60 of the same type, located on a face of the bridge 46 that is located on the side opposite the male part 22.

The device 10 according to embodiments of the disclosure can be used in the following manner Firstly, the body 16 is connected by its part J2 to a pipe 14 (FIGS. 1 and 3). The lock 18 is in the unlocked position shown in FIGS. 1 and 8. It is maintained in this position and held by the hooks 52 that engage and bear against the support 54 which can be seen in FIG. 11. The male part 22 of the nozzle 20 is engaged in the female part 24 supported by the pipe, by axial translation along the axis X, until the rib 24a engages by bearing on the members 28 and is axially retained by the members. The passage of the rib 24a between the members 28 can be achieved by force-fitting by the operator, or by facilitating this passage by bearing against the fins 30a of the tabs 26. Bearing against these fins consists in exerting a force on these fins in the direction of the axis X, causing the members 28 to move away from the axis X and therefore creating a gap between the members 28 and the nozzle 20. The male and female parts are then correctly connected and the lock 18 can be moved to its locked position. To achieve this, force is exerted by the operator on the bridge in the plane U, in order to move the lock 18 to the position shown in FIG. 12. The legs 42, 44 then slide on the surface 36 until the teeth 58 engage by elastic snap-fitting with the teeth 38. The sliding and snap-fitting of the teeth 58 on the teeth 38 create a hard point and the elastic deformation of the legs 42. Furthermore, the elastic return of the teeth 56 under the teeth 38 can generate a sound that informs the operator that the device is locked. In this position, in which the lock is lowered or engaged, the hooks 52 are separated from the supports 54 (FIG. 11) and the nozzle 20 can be seen through the openings 60, such that the operator also has a visual guide for the locking and proper connection of the device. The operator can unlock the device 10 by moving the lock 18 from its locking position to its unlocking position. To achieve this, the operator grabs the gripping tabs 56 and exerts a force in the direction of the bridge 46 of the lock, in the plane U on these tabs. The device 10 can undergo several successive locking and unlocking operations, without any risk of damage.

FIGS. 13 and 14 show a non-limiting example of use of a device 10 according to an embodiment of the disclosure inside a battery pack 62 of a motor vehicle. The battery pack 62 comprises several batteries housed in a box closed by a cover 64. The battery pack 62 is equipped with a cooling circuit 66 that can be connected to a source of cooling fluid by the device 10.

In the assembled position shown in the drawings, the axis X is vertical, and the axis Y is therefore horizontal. The cover 64 is an upper cover that is placed and secured on the box of the battery pack. It is possible to observe that the cover extends above the device 10 and advantageously rests on the rear face 20a of the device.

In FIG. 13, the nozzle 20 is correctly connected to the circuit 66, which is equipped with a nozzle 12 such as shown in FIG. 2. The lock 18 is in a locked position and the rear face 20a of the device is located in a horizontal plane Z1 that does not impede the attachment of the cover 64.

In FIG. 14, the nozzle is incorrectly connected to the circuit 66 and the lock 18 remains in an unlocked position. The device 10 is not correctly installed and the rear face 20a of the device is located in a horizontal plane Z2 above the plane Z1, thereby impeding the attachment of the cover 64. Even if the cover 64 can rest on the rear face 20a, it cannot be properly secured on the box of the battery pack 62.

The disclosure thus also serves an additional fool-proofing purpose, guaranteeing that the operator has properly connected the device 10 and the cooling circuit 66.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A fluid connection device for a fluid circuit, comprising:
   a body formed of one single part and comprising:
      a first tubular nozzle comprising a male part configured to be engaged in a female part of a second nozzle by an axial translation movement along an axis; and
      at least two elastically-deformable tabs that are diametrically opposed with respect to said axis, the tabs extending outwards from the first tubular nozzle, substantially parallel with said axis, and comprising first axial ends comprising retaining members configured to engage with said female part in order to lock the female part axially with respect to the male part, and second opposite axial ends comprising handling members provided for the purpose of elastically deforming the tabs and unlocking the male and female parts; and
   a lock retained by the body and mobile in translation on said body in a plane substantially perpendicular to said axis, from a first position wherein the tabs are released, allowing their elastic deformation, to a second position wherein the tabs are blocked, preventing their elastic deformation,
   wherein said lock comprises legs which are located on either side of the first tubular nozzle, between the first tubular nozzle and the second opposite axial ends, when the lock is in the first position and when the lock is in the second position.

2. The device according to claim 1, wherein the lock is generally U-shaped and is mounted to straddle said first tubular nozzle.

3. The device according to claim 1, wherein the legs comprise a first pair of legs extending on either side of the first tubular nozzle and configured to extend from the first tubular nozzle to said second opposite axial ends.

4. The device according to claim 3, wherein the legs of said first pair of legs are adapted to allow an elastic deformation of the tabs when the lock is in the first position, and to block an elastic deformation of the tabs when the lock is in the second position.

5. The device according to claim 4, wherein the legs of said first pair of legs comprise cavities adapted to receive the second ends of the tabs when the lock is in the first position, and abutments adapted to engage by bearing with the second ends of the tabs when the lock is in the second position.

6. The device according to claim 3, wherein the legs of said first pair of legs comprise protruding teeth configured to engage by elastic snap-fitting with elements of the first nozzle, when the lock is moved between the first and the second position.

7. The device according to claim 3, wherein the legs of said first pair of legs comprise gripping parts at their free ends.

8. The device according to claim 7, wherein the legs of said first pair of legs comprise protruding teeth configured to engage by elastic snap-fitting with elements of the first tubular nozzle, when the lock is moved between the first and the second position, and wherein the protruding teeth extend on one side of the legs of said first pair of legs, and the gripping parts are formed by edges that extend on the opposite side of the legs of said first pair of legs.

9. The device according to claim 3, wherein the legs comprise a second pair of legs extending on either side of the first tubular nozzle and configured to extend from the first tubular nozzle to said second opposite axial ends.

10. The device according to claim 9, wherein the legs of the second pair of legs are adapted to engage with the first tubular nozzle in order to ensure the lock is maintained on the first tubular nozzle.

11. The device according to claim 10, wherein the legs of the second pair of legs comprise maintaining hooks configured to engage with elements of the first tubular nozzle.

12. The device according to claim 9, wherein the legs of the second pair of legs are separated from the legs of the first of legs pair by small walls protruding from the first tubular nozzle.

13. The device according to claim 12, wherein the small walls are diametrically opposed with respect to said axis and extend in the same plane perpendicular to said axis and intersecting with said second opposite axial ends.

14. The device according to claim 1, wherein the lock comprises at least one opening through which it is possible to see the first tubular nozzle when the lock is in the second position, the first tubular nozzle being impossible to see when the lock is in the first position.

15. A motor vehicle comprising a fluid circuit equipped with at least one device according to claim 1.

16. A cooling circuit for a vehicle comprising at least one device comprising:
   a body formed of one single part and comprising:
      a first tubular nozzle comprising a male part configured to be engaged in a female part of a second nozzle by an axial translation movement along an axis; and
      at least two elastically-deformable tabs that are diametrically opposed with respect to said axis, the tabs extending outwards from the first tubular nozzle, substantially parallel with said axis, and comprising first axial ends comprising retaining members configured to engage with said female part in order to lock the female part axially with respect to the male part, and second opposite axial ends comprising handling members provided for the purpose of elastically deforming the tabs and unlocking the male and female parts; and
   a lock retained by the body and mobile in translation on said body in a plane substantially perpendicular to said axis, from a first position wherein the tabs are released, allowing their elastic deformation, to a second position wherein the tabs are blocked, preventing their elastic deformation.

17. A battery pack for a motor vehicle comprising a box containing batteries and a cooling circuit according to claim 16, said box comprising a removable cover configured to cover or rest on the device.

18. The battery pack according to claim 17, wherein the device comprises a bearing surface of said cover or a surface covered by said cover, said surface extending in a plane substantially perpendicular to said axis.

* * * * *